US005218352A

United States Patent [19]
Endoh et al.

[11] Patent Number: 5,218,352
[45] Date of Patent: Jun. 8, 1993

[54] LIQUID CRYSTAL DISPLAY CIRCUIT

[75] Inventors: Satoshi Endoh, Katano; Noriaki Furuta, Otsu; Hidemi Hashiya, Hirakata; Noriyuki Sakamoto, Sapporo, all of Japan

[73] Assignee: Matsushita Electric Industrial Co., Ltd., Osaka, Japan

[21] Appl. No.: 588,346

[22] Filed: Sep. 26, 1990

[30] Foreign Application Priority Data

Oct. 2, 1989 [JP] Japan ................................ 1-257371

[51] Int. Cl.[5] ......................... G02F 1/13; G08B 5/36
[52] U.S. Cl. ................................ 340/765; 340/811; 340/813
[58] Field of Search ............... 340/813, 812, 811, 794, 340/793, 784, 805, 765, 802, 804; 364/521; 368/66, 203, 204

[56] References Cited

U.S. PATENT DOCUMENTS

| | | | |
|---|---|---|---|
| 3,921,162 | 11/1975 | Fukai et al. | 340/813 |
| 4,158,786 | 6/1979 | Hirasawa | 340/802 |
| 4,168,498 | 9/1979 | Kubota et al. | 340/811 |
| 4,221,111 | 9/1980 | Onda et al. | 368/66 |
| 4,242,679 | 12/1980 | Morozumi et al. | 340/813 |
| 4,297,697 | 10/1981 | Mitsui | 340/765 |
| 4,385,294 | 5/1983 | Miles | 340/784 |
| 4,395,135 | 7/1983 | Frantz | 368/66 |
| 4,570,115 | 2/1986 | Misawa et al. | 340/813 |
| 4,621,261 | 11/1986 | Hehlen et al. | 340/813 |
| 4,676,602 | 6/1987 | Watanabe | 340/805 |
| 4,728,946 | 3/1988 | Sharples | 340/765 |
| 4,769,639 | 9/1988 | Kawamura et al. | 340/793 |
| 4,922,448 | 5/1990 | Kunieda et al. | 364/521 |

OTHER PUBLICATIONS

"MN1871610 LSI Instruction Manual", First Edition, Prepared by Matsushita Electronics Corporation, Oct., 1988, pp. 87–95.

*Primary Examiner*—Alvin E. Oberley
*Assistant Examiner*—Steven J. Saras
*Attorney, Agent, or Firm*—Stevens, Davis, Miller & Mosher

[57] ABSTRACT

A liquid crystal display (LCD) circuit comprising a duty changing device for changing the driving duty cycle of an LCD in accordance with a power supply switching command signal, and a bias changing device for changing the display bias voltage produced by a bias producing device to cause the LCD to display information, in accordance with a power supply switching command signal externally supplied to the LCD circuit. Even when electric power to be supplied from plural power supplies to the bias producing device is switched in accordance with the power supply switching command signal, a change in the display contrast of the LCD can be suppressed.

2 Claims, 9 Drawing Sheets

PROIR ART

S: SELECTION VOLTAGE
N: NON-SELECTION VOLTAGE
$V_{LCD}$: LCD DRIVING VOLTAGE

LIQUID CRYSTAL DISPLAY CIRCUIT

BACKGROUND OF THE INVENTION

1. Field of the Invention

The present invention relates to a liquid crystal display circuit for use in an apparatus which is required to always display information such as a clock time, timer operating time, etc. even in a state where the main operating power supply such as a home AC power source does not operate. Such an apparatus is provided with a driving means which can operate by either the home AC power source or a battery, or an auxiliary power source such as a battery which serves to prevent the information such as the clock time from being lost by a failure of the home AC power source. Such an apparatus includes an audio device with a compact disk player called "CD radio-cassette", an audio device such as a radio with a clock, a video device such as a video cassette recorder with a clock, etc.

2. Description of the Related Art

In recent years, home electric apparatuses have been developed to have integrated functions to a very high degree. For example, the audio device called "CD radio-cassette" incorporates the functions of a clock, timer, radio, cassette tape recorder and compact disk player.

There is also an audio device such as a radio with a clock and a video device such as a video cassette recorder with a clock, in which their main functions are combined only with a clock and/or a timer.

Many products among the above devices, which have been on the market, are designed so that the same liquid crystal display device serves as both displays for a clock or a timer and for the other main function. These products are provided with a driving means which can operate by either a home AC power source or a battery, or an auxiliary power source such as a battery which serves to prevent information such as the clock time from being lost by a failure of the home AC power source. The purpose thereof is to always display, on a liquid crystal display device, information such as a clock time, timer operating time, etc. even in a state where a main operating power supply such as a home AC power source is not available.

FIG. 7 shows a structure of a part of the prior art liquid crystal display device related with the present invention. In FIG. 7, 1 denotes a liquid crystal display (LCD); 2 denotes a display driving means; 3 denotes a bias producing means; 5 denotes plural power supply means including a first power supply means 6 for supplying electric power from a home AC power source and a second power supply means 7 for supplying auxiliary electric power from a battery; and 8 denotes a power supply switching means.

FIG. 8 is a circuit diagram used to produce $\frac{1}{3}$ biases in the bias producing means 3. The voltage $V_{DD}$ supplied from power switching means 8 is divided by R1, R2, R3 and R' to provide output voltages $V_{LC0}$, $V_{LC1}$ and $V_{LC2}$ which are used as bias voltages in the display driving means 2.

In the prior art display circuit, normally, R1=R2=R3. Therefore, the relationship among the bias voltages can be represented by $$V_{DD}-V_{LC0}=V_{LC0}-V_{LC1}=V_{LC1}-V_{LCW}=V_{LCD}/3$$

where $V_{LCD}$ indicates an LCD driving voltage which can turn on the liquid crystal display. $V_{LCD}$ is selected to be a voltage substantially equal to $V_{DD}$.

In this example, assuming R'=0 (Ω), the setting is made as shown below.

$$V_{LC2}=0(V), \text{ and } V_{LCD}=V_{DD}$$

FIG. 9 is a waveform chart showing the driving voltages for LCD 1. LCD 1 displays information in a time-divisional manner by using two kinds of lines of "common (COM)" and "segment (SEG)". A certain display pixel at a position indicated by two lines of COM and SEG is turned on or off depending on whether or not a difference voltage between COM and SEG is an AC voltage exceeding a predetermined voltage ($V_{LCD}$), at the timing when the display pixel is selected. Thus, assuming that the display data when a certain display pixel is to be turned on is "1", as shown in FIG. 9, the display pixel is turned on during a period when a large difference voltage of $2V_{LCD}$ sufficient for turning-on is generated between COM and SEG at the timing of selection of COM and SEG, whereas it is not turned on in the other periods, i.e. when, even with the display data being "1", COM is not selected, and when the display data is "0", since, in these other periods, the difference voltage between COM and SEG is only $\frac{2}{3}$ $V_{LCD}$.

FIG. 10 shows an example of connection between LCD 1 and display driving means 2 when operating with $\frac{1}{3}$ bias and $\frac{1}{4}$ duty cycle to display a clock time, etc. Solid lines and dotted lines showing wirings within LCD 1 represent the connections of SEG lines and COM lines for applying signal voltages to the individual display pixels, respectively. In the example of FIG. 10, a timing control circuit in display driving means 2 produces selection signal voltages of COM 0 to COM 3 as shown in the timing chart of FIG. 11, which illustrates, as an example, signal voltage waveforms on SEG 2 line and respective COM lines and potential difference waveforms therebetween, and also signal voltages of SEG 0 to SEG 7 in accordance with the display data.

Thus, if the display data on the display driving means 2 shown in FIG. 10 are supplied to SEG's 0 to 7 in synchronism with the outputs from COM 0 to COM 3, the above-exemplified prior art display circuit can display 0.123, for example, on LCD 1 as seen from FIG. 10. Here, however, the display of 0.123 does not have a particular meaning such as a clock time.

As shown in FIG. 7, the voltage $V_{DD}$ to be supplied to bias producing means 3 changes in accordance with the state of power supply selected by power supply switching means 6 from plural power supply means 5 including first power supply means 6 for supplying electric power from a home AC power source and a second power supply means 7 for supplying auxiliary electric power from a battery.

Namely, first power supply means 6 maintains a stabilized voltage of e.g. +5 (V) or so, and becomes 0 (V) only when it is disconnected from the home AC power source, whereas second power supply means 7 changes its output voltage e.g. from +5 (V) to +3 (V) in accordance with the duration of use, because it includes a power source such as a battery.

The power supply is changed or switched from first power supply means 6 to second power supply means when the first power supply means 6 is disconnected from the home AC power supply or when a power source switching command signal A is applied by the operation of the device by a user.

However, the prior art LCD circuit described above has the following problems when it is put to use. Namely, as the voltage $V_{DD}$ to be supplied to bias producing means 3 changes, the display density (hereinafter referred to as "contrast") of display pixels on LCD 1 also greatly changes. Thus, the usable period of the second power supply means 7 for supplying auxiliary electric power from a battery, i.e. the life of the battery is reduced. Further, if the power supply is changed from first power supply means 6 to second power supply means 7 in the state where the battery voltage has been decreased, $V_{DD}$ will be abruptly decreased from +5 (V), thereby suddenly causing a great change in the contrast. In this case the user will receive an unusual impression of the display.

SUMMARY OF THE INVENTION

An object of the present invention is to provide a liquid crystal display (LCD) circuit which can increase the usable time or life of the battery used in the second power supply means 7 and also can prevent a user from receiving an unusual impression of the display by suppressing a change in the contrast thereof, even when $V_{DD}$ has abruptly changed from +5 (V) when switching from the first power supply 6 to the second power supply 7 is made by the power supply switching means 8 in a state where the battery voltage has been decreased.

In order to achieve the above object, in accordance with the present invention, there is provided an LCD circuit comprising a liquid crystal display (LCD), bias producing means for producing a display bias voltage used to cause the LCD to display information, a plurality of power supply means, power supply switching means for switching power supply from the plurality of power supply means to the bias producing means by a power supply switching command signal externally supplied to the LCD circuit, duty changing means for changing a driving duty cycle of the LCD by using the power supply switching command signal, display driving means for producing a signal used to cause the LCD to display information in accordance with display data externally supplied to the LCD circuit by using the display bias voltage produced by the display bias producing means and the duty cycle corresponding to the output of the duty changing means, and bias changing means for switching the display bias voltage produced by the bias producing means to cause the LCD to display information by using the power supply switching command signal externally supplied to the LCD circuit.

In accordance with the present invention, there are provided duty changing means for changing a driving duty cycle of the LCD by using the power supply switching command signal, and bias changing means for switching the display bias voltage produced by the bias producing means to cause the LCD to display information by using the power supply switching command signal. Therefore, the present invention can realize an LCD circuit in which the display contrast of the LCD does not change so much even when power supply from the plurality of power supply means to the bias producing means is switched by the power supply switching command signal externally supplied to the LCD circuit.

DESCRIPTION OF THE PREFERRED EMBODIMENT

Figure 1:
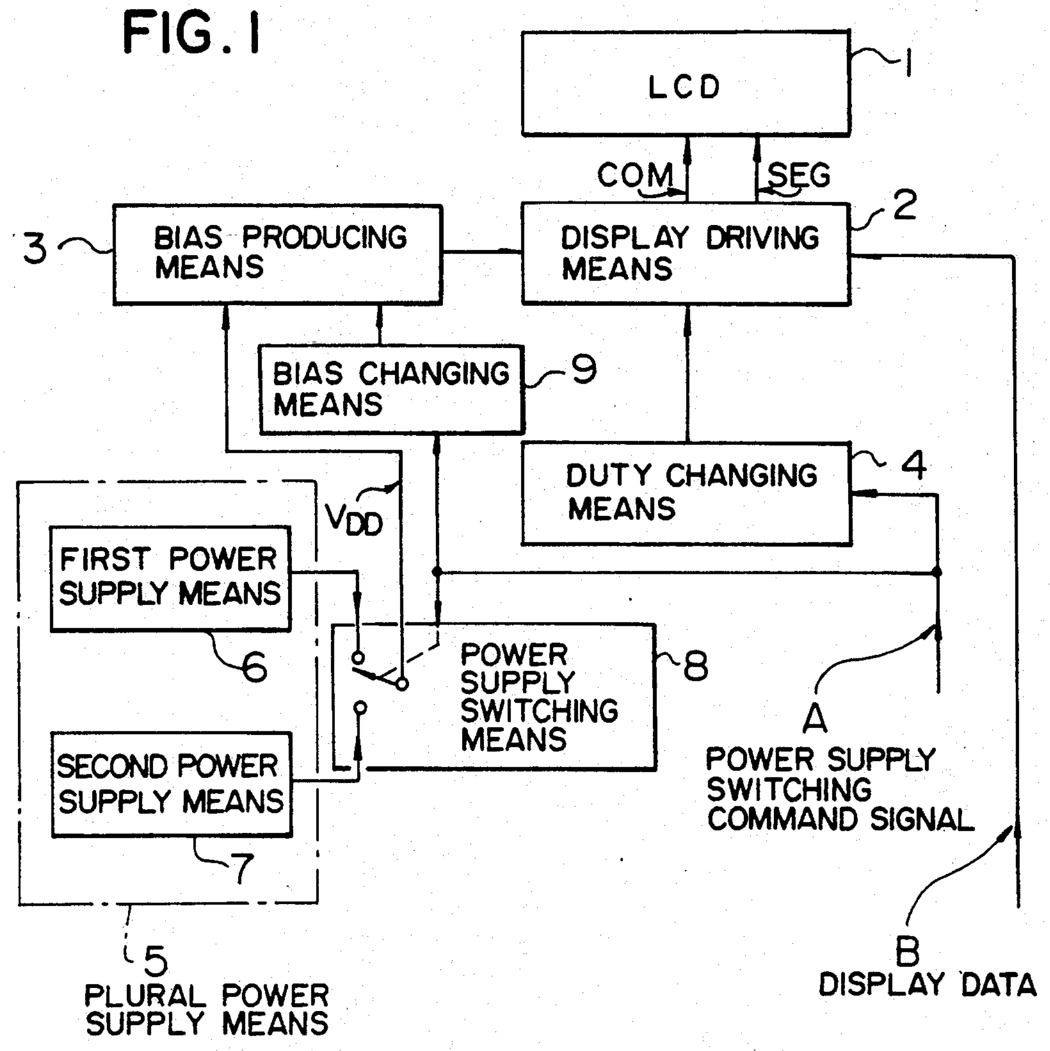
FIG. 1 is a block diagram showing a main part of a liquid crystal display (LCD) circuit according to an embodiment of the present invention.

Now referring to the drawings, an explanation will be made of a liquid crystal display (LCD) circuit according to the present invention. FIG. 1 shows the arrangement of a main part of the LCD circuit according to an embodiment of the present invention. In FIG. 1, 1 denotes a liquid crystal display (LCD); 2 denotes a display driving means; 3 denotes a bias producing means; 4 denotes a duty changing means; 5 denotes plural power supply means including a first power supply means 6 for supplying electric power from a home AC power source and a second power supply means 7 for supplying auxiliary electric power from a battery; 8 denotes a power supply switching means; and 9 denotes a bias changing means.

Figure 2:
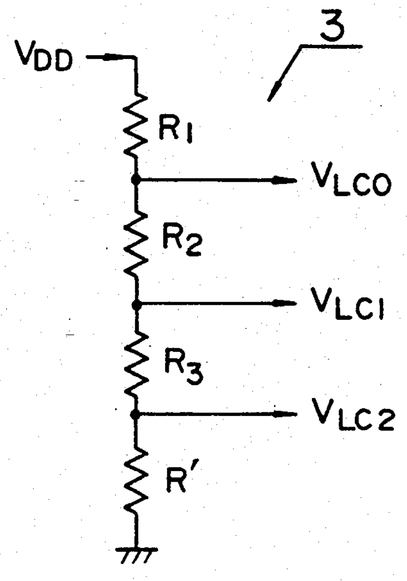
FIG. 2 is a concrete circuit diagram illustrating to a circuit used to produce $\frac{1}{3}$ bias in the bias producing means 3 in the embodiment of the present invention.

FIG. 2 is a circuit diagram for producing $\frac{1}{3}$ bias in bias producing means 3. The voltage $V_{DD}$ supplied from power switching means 8 is divided by R1, R2, R3 and R' to provide output voltages $V_{LC0}$, $V_{LC1}$ and $V_{LC2}$ which are used as bias voltages for display driving means 2.

In the prior art display circuit, normally, R1=R2=R3. Therefore, the following relationship exists among the bias voltages:

$$V_{DD}-V_{LC0}=V_{LC0}-V_{LC1}=V_{LC1}-V_{LC2}=V_{LCD}/3$$

where $V_{LCD}$ indicates an LCD driving voltage which can turn on the liquid crystal display. $V_{LCD}$ is selected to be a voltage substantially equal to $V_{DD}$.

In this example, assuming $R'=0$ (Ω), the setting is made as shown below.

$$V_{LC2}=0\text{ (V), and } V_{LCD}=V_{DD}$$

Figure 9:
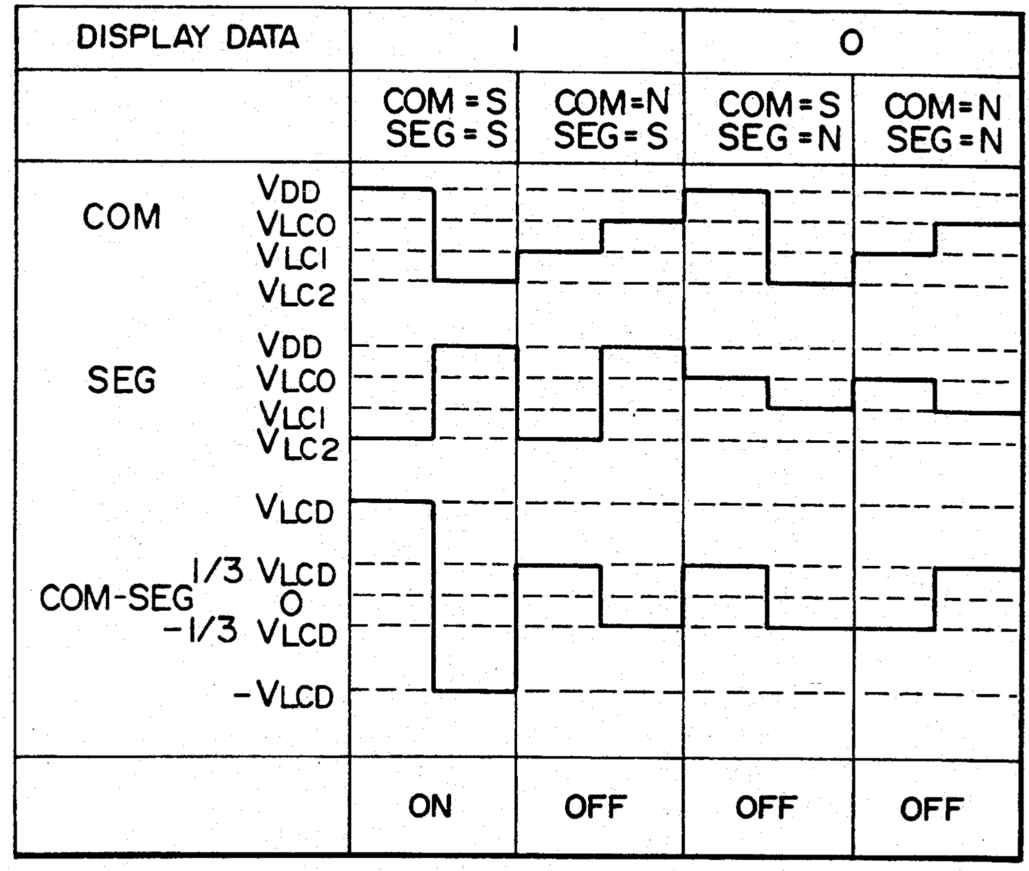
FIG. 9 is a waveform chart showing the waveforms of the driving voltages applied to the LCD 1.
Figure 10:
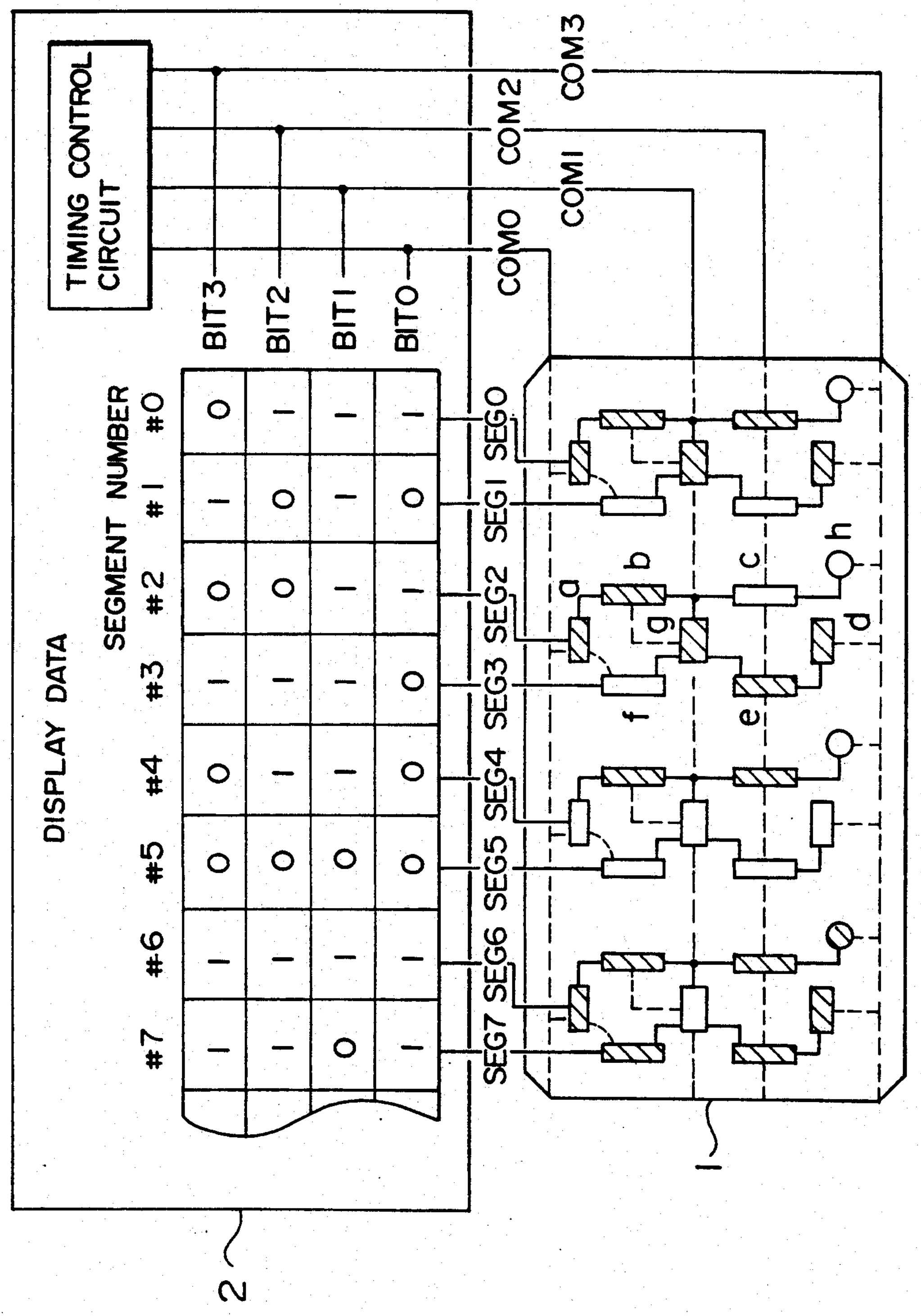
FIG. 10 PRIOR ART
FIG. 10 is a circuit diagram showing an example of connection between the LCD 1 and the display driving means 2 when making $\frac{1}{3}$ bias and $\frac{1}{4}$ duty driving to display a clock time, etc. in the prior art.
Figure 11:
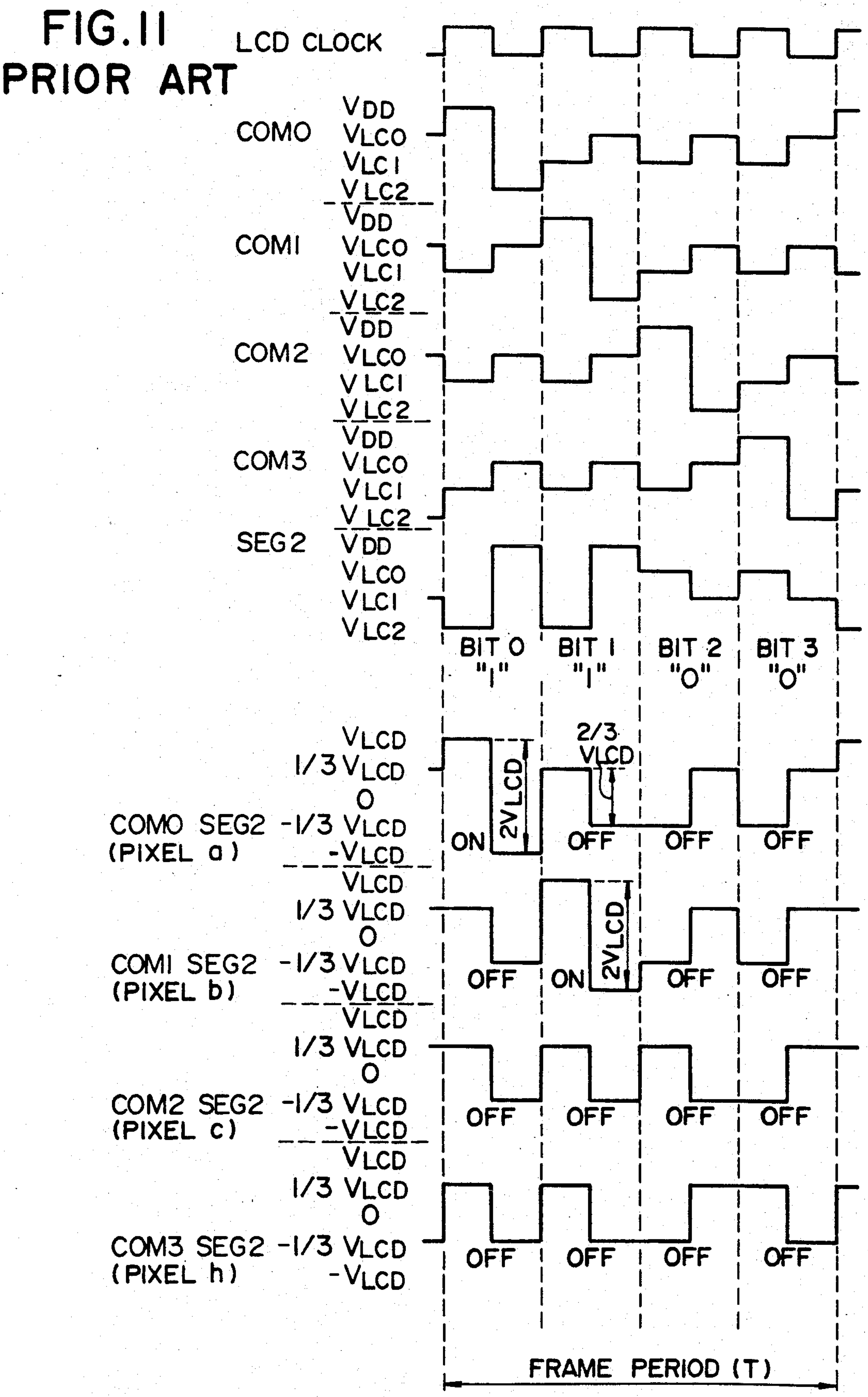
FIG. 11 PRIOR ART
FIG. 11 is a timing chart showing waveforms at several positions of the LCD in the prior art.

The waveforms of the driving voltages to be supplied to the LCD 1 are the same as those shown in FIG. 9 in connection with the prior art.

Figure 3:
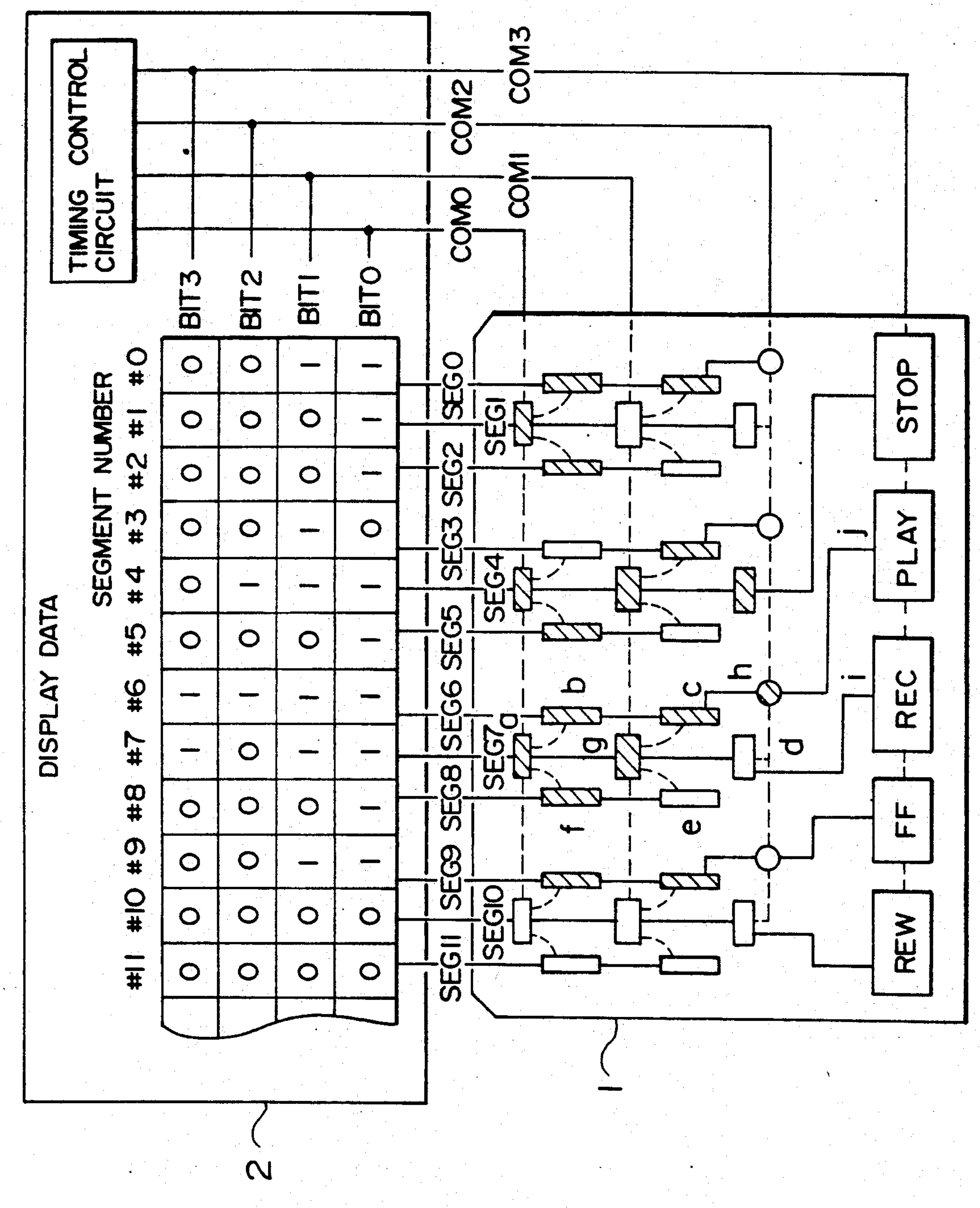
FIG. 3 is a circuit diagram showing an example of connection between the LCD 1 and the display driving means 2 when making $\frac{1}{3}$ bias and both $\frac{1}{4}$ duty and $\frac{1}{3}$ duty driving to display a clock time, etc. in the embodiment of the present invention.

FIG. 3 is a circuit diagram showing an example of connection between the LCD 1 and the display driving means 2 when making ⅓ bias and both ¼ duty and ⅓ duty driving to display a clock time, etc. in the embodiment of the present invention. Solid lines and dotted lines showing wirings within LCD 1 represent the connections of SEG lines and COM lines for applying signal voltages to the individual display pixels, respectively.

Now it is assumed that the apparatus including the LCD circuit according to this embodiment has the functions of a clock and a tape recorder, and the LCD 1 can display a four digit numeral and the operation modes of a tape recorder, i.e. "REW", "FF", "REC", "PLAY" and "STOP". It is also assumed that the tape recorder operates only when power is supplied from first power supply means 6 in the plural power supply means 5, whereas the four digit numeral indicative of a clock time is always displayed so far as electric power is supplied from either first power supply means 6 or second power supply means 7.

Figure 4:
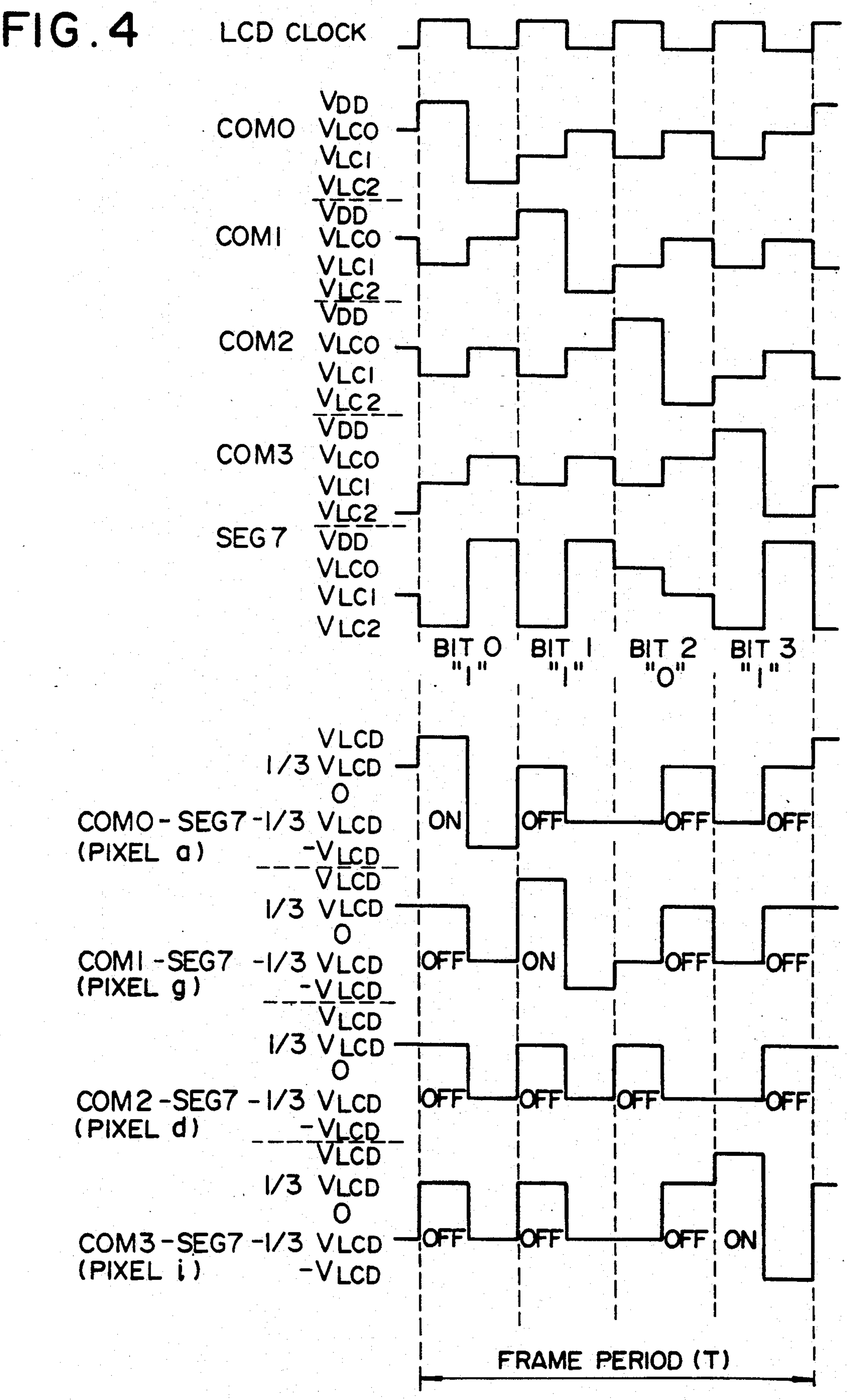
FIG. 4 is a timing chart showing waveforms at several positions of the LCD 1 when making $\frac{1}{4}$ duty driving in the embodiment of the present invention.

In the connection shown in FIG. 3, when electric power is supplied from first power supply means 6 by the application of a power supply switching command signal A and then the tape recorder is running in a recording mode, duty changing means 4 supplies a command for ¼ duty cycle driving to display driving means 2 by the application of the power supply switching command signal A. As a result, display driving means 2 produces selection signal voltages of COM0 to COM3 as shown in the timing chart of FIG. 4, which illustrates, as an example, signal voltage waveforms on SEG2 line and respective COM lines and potential difference waveforms therebetween, and also signal voltages of SEG0 to SEG11 in accordance with the display data.

Thus, the outputs of COM0 to COM3 and the outputs of SEG0 to SEG11 in synchronism therewith turn on the display pixels of respective digits on LCD 1 thereby to display the contents of the display data. Therefore, when electric power is supplied from first power supply means 6, the clock time of "19.57" (seven fifty-seven in the afternoon), for example, is displayed by the turning-on of the display pixels of the respective digits on LCD 1, and the tape running modes of "REC" and "PLAY", for example, are displayed, as seen from FIG. 3.

Figure 5:
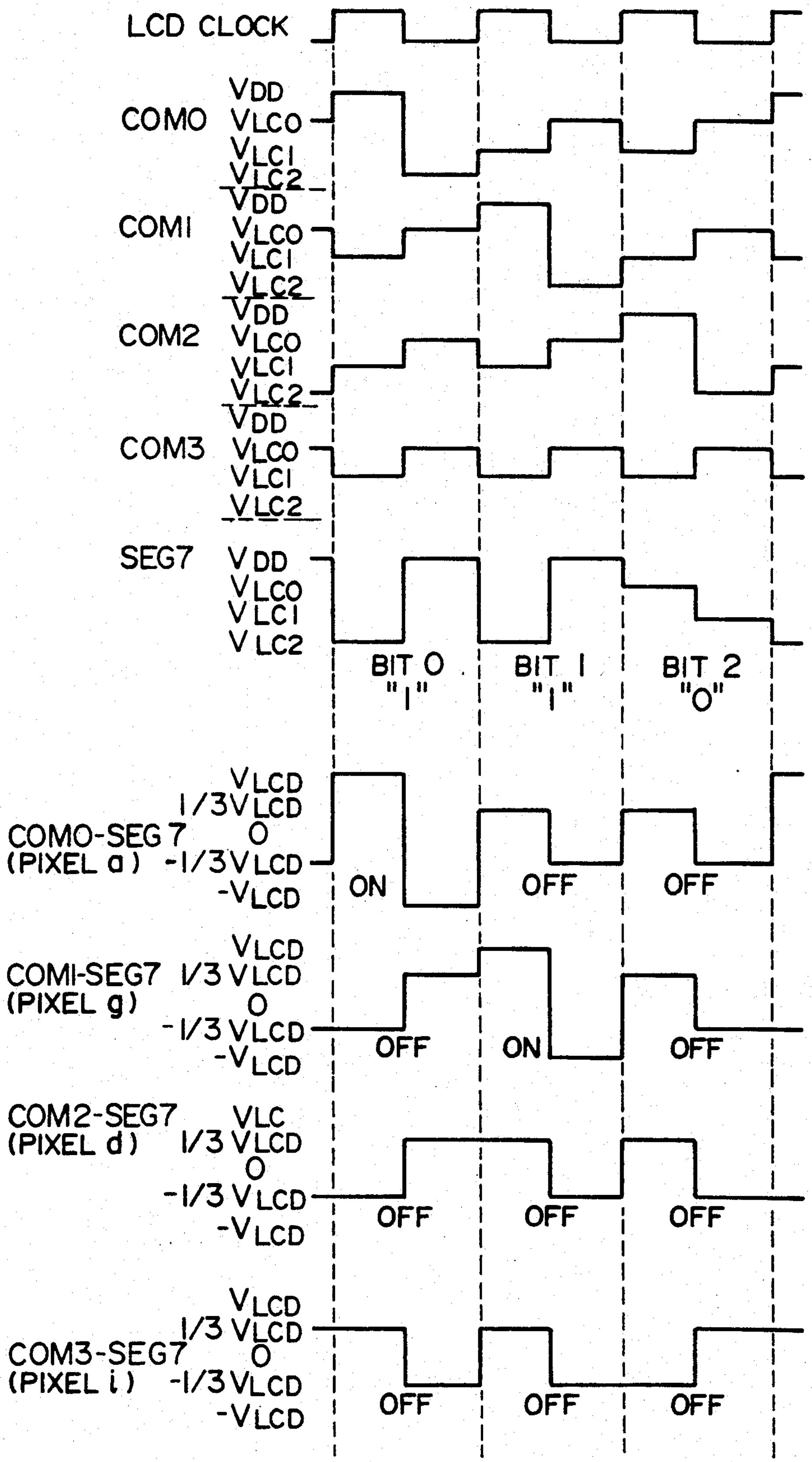
FIG. 5 is a timing chart showing waveforms at several positions of the LCD 1 when making $\frac{1}{3}$ duty driving in the embodiment of the present invention.

On the other hand, in the connection shown in FIG. 3, when electric power is not supplied from first power supply means 6 in accordance with the above command signal A and then the tape recorder does not operate, duty changing means 4 supplies a command for ⅓ duty cycle driving to display driving means 2. As a result, like the case of FIG. 4, display driving means 2 produces the signal voltages of SEG0 to SEG11 in accordance with the display data, as shown in the timing chart of FIG. 5 illustrated with respect to SEG7. But, since the selection signal voltages of COM0 to COM3 select the ⅓ duty cycle driving in place of ¼ duty cycle driving, only COM3 produces an AC voltage between $V_{LC0}$ and $V_{LC1}$. Because of the output voltage of COM3, the display pixels ("REW", "FF", "REC", "PLAY" and "STOP") connected with COM3 necessarily are turned off, irrespective of the display data, during the ⅓ duty cycle driving.

In this way, when electric power is not supplied from first power supply means 6, unlike the previous case where the tape running modes of "REC" and "PLAY" are also displayed, only the clock time of "19.57" is displayed by the respective display pixels of LCD1.

Here, it should be noted that, as described in connection with the prior art, the power supply voltage $V_{DD}$ to be supplied to bias producing means 3 changes in accordance with the state of power source selected by power supply switching means 6 from plural power supply means 5 including first power supply means 6 for supplying electric power from a home AC power source and a second power supply means 7 for supplying auxiliary electric power from a battery.

Namely, first power supply means 6 maintains a stabilized voltage of e.g. +5 (V) or so and becomes 0 (V) only when it is disconnected from the home AC power source, whereas second power supply means 7 changes its output voltage e.g. from +5 (V) to +3 (V) in accordance with the use time, because it includes a power source such as a battery. However, unlike the prior art, this embodiment is in the state of ¼ duty cycle driving when electric power is supplied from first power supply means 6, and it is in the state of ⅓ duty cycle driving when electric power is supplied from second power supply means 7.

The display density (contrast) of display pixels of an LCD become higher as the driving duty cycle (ratio) becomes greater, provided that the same LCD is used, and, at the same time, the operating bias voltage is also the same. That is, if the value of $V_{DD}$ is the same, the contrast is higher in the state of ⅓ duty cycle driving as compared with the state of ¼ duty cycle driving.

This means that the same contrast can be obtained by a lower value of $V_{DD}$ in the state of ⅓ duty cycle driving as compared with the ¼ duty cycle driving.

It was ascertained by an experiment using an LCD for ¼ for duty cycle driving that, in the state of ¼ duty cycle driving, it became difficult to perceive the display at about 4 (V), whereas, in the state of ⅓ duty cycle driving, it was sufficiently possible to perceive the display at down to 3.5 (V). The life of the battery of second power supply means depends greatly on whether the contrast of LCD is insufficient to be perceived at the time of $V_{DD}=4$ (V) or it remains sufficient to be perceived at down to $V_{DD}=3.5$ (V). The latter case can increase the battery life to be far longer than the former case.

In accordance with this embodiment, as shown in FIG. 3, the arrangement of the display pixels of LCD 1 is devised so that the display pixels, which are not displayed when electric power is not supplied from first power supply means 6, are arranged on the line of COM3, whereas, the display pixels, which are always displayed when electric power is supplied from either first power supply means 6 or second power supply means 7, are arranged on the lines of COM0 to COM2. Further, duty changing means 4 is provided to change the duty cycle when driving the LCD 1 in accordance with the power supply switching command signal A for switching electric power supply from a plurality of power supply means 5 to bias producing means 3 between first power supply means 6 and second power supply means 7. Thus, if a driving signal for driving the LCD 1, which corresponds to the current driving duty cycle, is supplied to LCD 1, the life of the battery used in second power supply means 7 can be increased as compared with the prior art. Further, even when power supply is switched between from first power supply means 6 and from second power supply means 7 by power supply switching means 8 in a state where the voltage of the battery used in second power supply means 7 has dropped to a certain degree but not extremely, a change in the display contrast can be reduced to be much smaller than in the prior art. Thus, an LCD circuit, which prevents a user from receiving an unusual impression of the display, can be realized.

Thus, an explanation has been made on the embodiment in which the driving duty cycle when driving LCD 1 is switched between ¼ and ⅓. However, the driving duty cycle may be changed to a greater degree. For example, LCD 1 may be used in such a manner that, when electric power is supplied from first power supply means 6, LCD 1 is driven with ¼ duty cycle, whereas, when electric power is supplied from second power supply means 7, LCD 1 is driven with ½ duty cycle. However, in this manner of operation, when the voltage of the battery used in second power supply means 7 is sufficiently high, the contrast is appropriate during the ¼ duty cycle driving, however, the contrast is too high during the ½ duty cycle driving, so that the display pixels to be turned off may still appear to have been turned on. In order to prevent such an undesirable effect, a bias changing means 9 is provided in accordance with the present invention.

Figure 6:
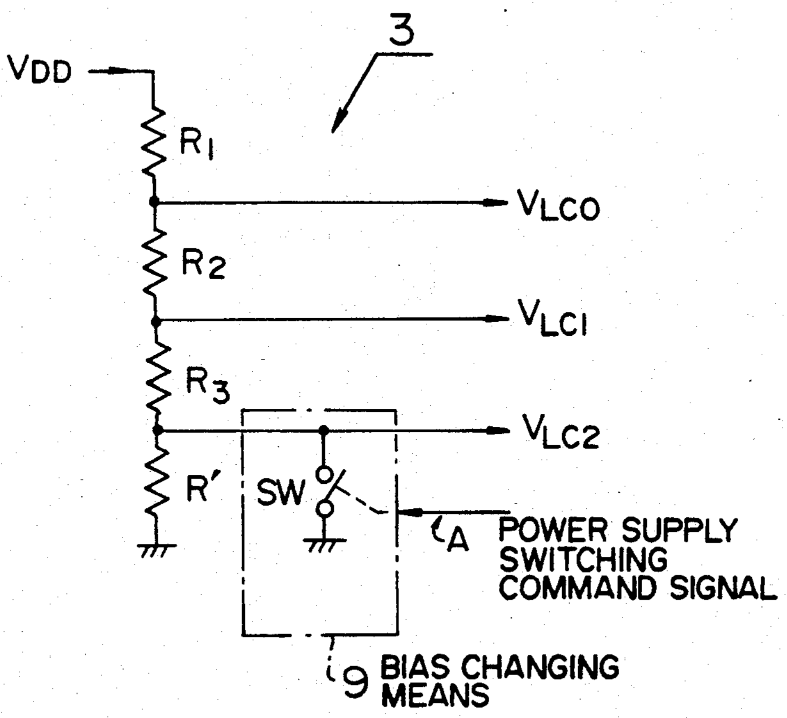
FIG. 6 is a concrete circuit diagram illustrating the bias changing means 9 disposed in the bias producing means 3 in the embodiment of the present invention.
Figure 7:
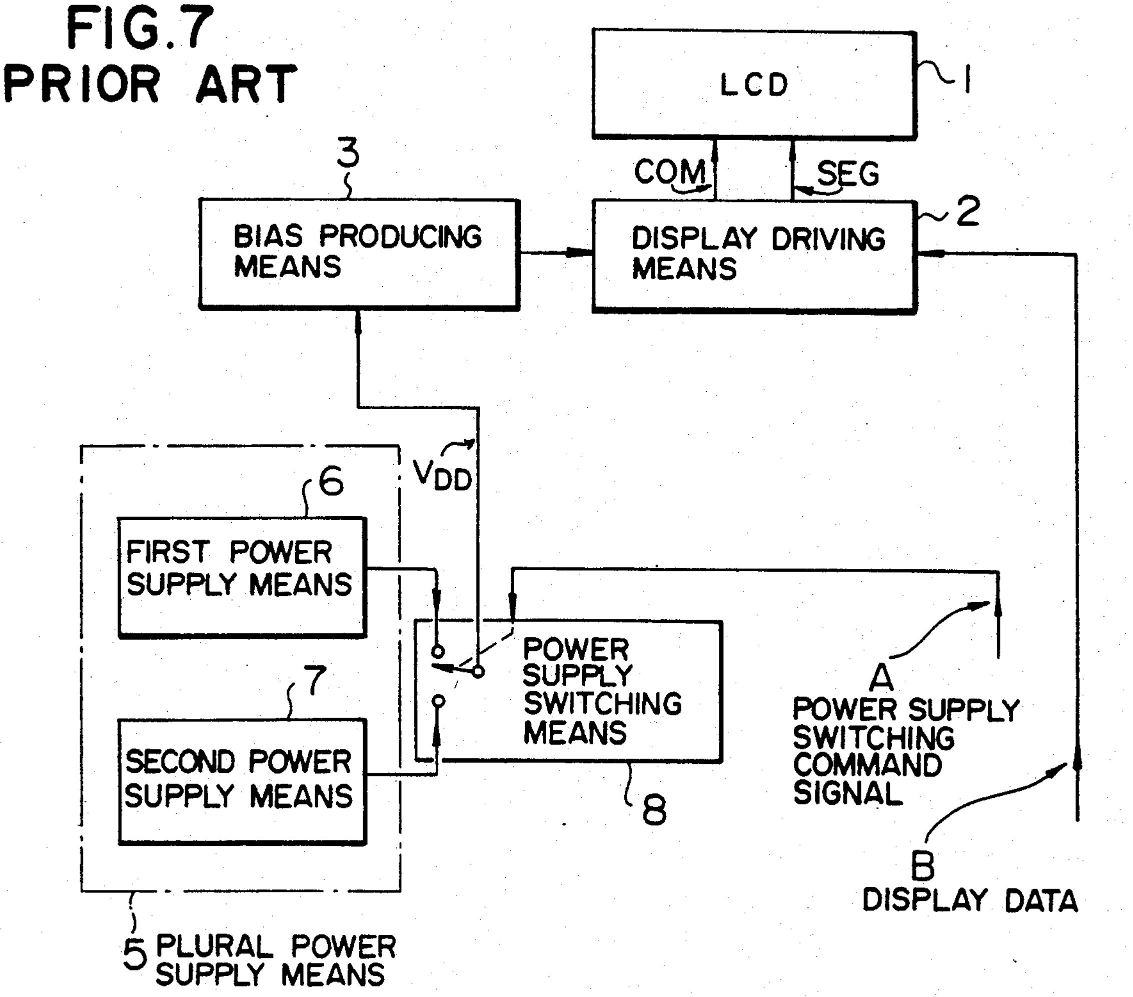
FIG. 7 PRIOR ART
FIG. 7 is a block diagram showing a part of the prior art LCD circuit related with the present invention.
Figure 8:
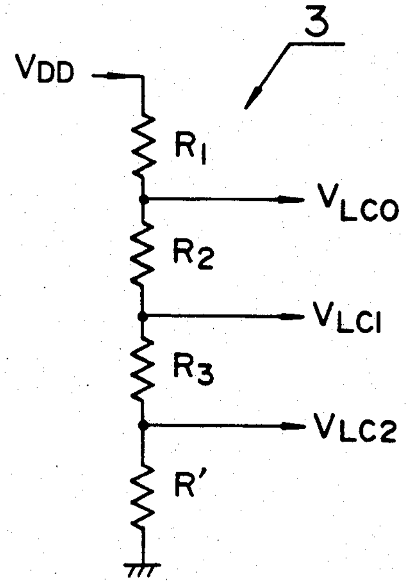
FIG. 8 PRIOR ART
FIG. 8 is a concrete circuit diagram illustrating a circuit used to produce $\frac{1}{3}$ bias in the bias producing means 3 in the prior art.

FIG. 6 is a concrete circuit diagram showing the bias changing means 9.

The bias changing means 9, which is connected with bias producing means 3, serves to change the resistance of a resistor R' for producing the bias voltage $V_{LC2}$. The bias changing means 9 changes $V_{LC2}$ in accordance with the power supply changing command signal A thereby to reduce the contrast to some degree, otherwise, the contrast may become too high, e.g. in the state of ½ duty cycle driving. The principle thereof will be explained hereunder.

In FIG. 6, the voltage $V_{DD}$ supplied from power switching means 8 is divided by R1, R2, R3 and R' to provide output voltages $V_{LC0}$, $V_{LC1}$ and $V_{LC2}$ which are supplied to display driving means 2 to be used as bias voltages therein. Assuming that R1=R2=R3, the relationship among the bias voltage is represented as follows.

$$V_{DD}-V_{LC0}=V_{LC0}-V_{LC1}=V_{LC1}-V_{LC2}=(V_{DD}-V_{LC2})/3=V_{LCD}/3$$

If R'=0 (Ω), the $V_{LC2}=0$ (V), and hence $V_{LCD}=V_{DD}$ results. If R'≠0 (Ω), $V_{LC2}\neq 0$ (V), and then $V_{LCD}<V_{DD}$ results. Namely, the larger is the resistance value of resistor R', the smaller is the LCD driving voltage. Thus, same effect as that the power supply voltage has lower value can be obtained when the switch SW is OFF, as compared with when SW is ON. Thus, if LCD 1 is driven with the same duty cycle, the contrast can be reduced in this case.

In accordance with the embodiment, the advantage of the present invention can be obtained also in the case where the duty cycle is changed greatly, e.g. where LCD 1 is operated in the state of ¼ duty cycle driving when electric power is supplied from first power supply means 6, whereas, LCD 1 is operated in the state of ½ duty cycle driving when electric power is supplied from second power supply means 7. In order to provide for such a case, the arrangement of the display pixels of LCD 1 is devised so that the display pixels, which are not displayed when electric power is not supplied from first power supply means 6, are arranged on the lines which permit the display pixels to be displayed only in the state of ¼ duty cycle driving, whereas, the display pixels, which are always displayed when electric power is supplied from either first power supply means 6 or second power supply means 7, are arranged on the lines which permit the display pixels to be displayed in the state of ½ duty cycle driving as well. Duty changing means 4 is also provided to change the duty cycle when driving the LCD 1 in accordance with the power supply switching command signal A for switching electric power supply from a plurality of power supply means 5 to bias producing means 3 between first power supply means 6 and second power supply means 7. With this arrangement, a driving signal corresponding to the current driving duty cycle is supplied to LCD 1. Further, a bias changing means 9 is provided to change the bias voltage for making a display by LCD 1 in accordance with the power supply switching command signal A. By virtue of the provision of the bias changing means 9, the contrast of LCD 1 can be made appropriate and also the life of the battery used in second power supply means 7 can be increased as compared with the prior art. Further, even when electric power supply is switched between first power supply means 6 and second power supply means 7 by power supply switching means 8 in a state where the voltage of the battery used in second power supply means 7 has dropped to a certain degree but not extremely, a change in the display contrast can be reduced to be much smaller than the prior art. Thus, an LCD circuit, which prevents a user from receiving an unusual impression of the display, can be realized.

In the embodiment, an LCD using ⅓ bias was employed, but an LCD using any other bias voltages may also be used.

Further, in this embodiment, the LCD was operated in the state of ¼, ⅓ or ½ duty cycle driving, but it may be operated in the state of any other duty cycle driving.

Further, although the embodiment is arranged so that two kinds of power supply means can be selected from among plural power supply means, any number of power supply means and any power source other than a home AC power source and a battery can be used.

Further, although, in the embodiment, the resistors R1, R2 and R3 in the bias producing means were selected to have the same value, they may be selected to have respective different value.

As described above, an LCD circuit according to the present invention comprises a liquid crystal display (LCD), bias producing means for producing display bias voltages used to make the LCD display information, a plurality of power supply means, power supply switching means for switching electric power supply from the plurality of power supply means to the bias producing means by using a power supply switching command signal externally supplied to the LCD circuit, duty changing means for changing the driving duty cycle of the LCD by using the power supply switching command signal, and display driving means for producing a signal used to cause the LCD to display information in accordance with display data externally supplied to the LCD circuit by using the display bias voltages produced by the display bias producing means and the duty cycle corresponding to an output of the duty changing means; or the LCD circuit of the present invention further comprises bias changing means for changing the display bias voltage produced by the bias producing means to cause the LCD to display information by using the power supply switching command signal externally supplied to the LCD circuit. Thus, the present invention can realize an LCD circuit which can increase the duration of the usable time, or the life, of a battery, etc. included in the plurality of power supply means, and the present invention also prevents a user from receiving an unusual impression of the display by suppressing a change in the contrast of the display, even when the value of the voltage $V_{DD}$ has decreased suddenly due to the switching of power supply to the bias producing means by the power supply switching means in a state where the battery voltage has dropped.

We claim:

1. A liquid crystal display circuit comprising:

a liquid crystal display (LCD) having a plurality of display pixels;

display bias producing means for producing display bias voltages used to cause the display pixels to display information;

a plurality of power supply means;

power supply switching means for switching power supply to the bias producing means from among the plurality of power supply means in response to a power supply switching command signal extremely supplied to the LCD circuit;

duty changing means for producing an output signal for designating a driving duty cycle of the LCD to be one of a plurality of driving duty cycle modes including at least a first driving duty cycle mode and a second driving duty cycle mode in response to the power supply switching command signal, said driving duty cycle modes being in units of 1/n, where n is an integer, and said display pixels including first display pixels operable in either one of said first driving duty cycle mode and said second driving duty cycle mode and second display pixels operable only in said second driving duty cycle mode; and display driving means for producing a signal for causing one of (a) both the first display pixels and the second display pixels or (b) only said first display pixels to display information in accordance with the display bias voltages produced by the display bias producing means and the output signal from said duty changing means designating one of said first driving duty cycle mode and said second driving duty cycle mode.

2. A liquid crystal display circuit according to claim 1, further comprising bias changing means for changing the display bias voltages produced by the bias producing means to cause the display pixels to display information, in response to the power supply switching command signal externally supplied to the LCD circuit.

* * * * *